United States Patent [19]

Sasaki et al.

[11] Patent Number: 5,665,162
[45] Date of Patent: Sep. 9, 1997

[54] COATING DEVICE

[75] Inventors: Kazuo Sasaki; Toshio Hikichi, both of Miyagi, Japan

[73] Assignee: Sony Corporation, Tokyo, Japan

[21] Appl. No.: 517,831

[22] Filed: Aug. 22, 1995

[30]     Foreign Application Priority Data

Aug. 22, 1994 [JP]  Japan ................................ 6-196614

[51] Int. Cl.$^6$ ................................................ B05C 3/02
[52] U.S. Cl. ................................... 118/410; 118/419
[58] Field of Search ................................. 118/410, 411, 118/419; 425/461; 427/356

[56]              References Cited

U.S. PATENT DOCUMENTS 5,376,178  12/1994  Sato ...................................... 118/411

FOREIGN PATENT DOCUMENTS 0 539 724 A1   5/1993   European Pat. Off. .
2 679 797 A1   5/1993   France .
41 12 428 A 1  10/1991  Germany .

Primary Examiner—Brenda A. Lamb
Attorney, Agent, or Firm—Hill, Steadman & Simpson

[57]                ABSTRACT

An extrusion coating device comprising a die having its distal end composed of an upper lip and a lower lip and having a slit provided between the upper lip and the lower lip, for extruding a paint through the slit to apply the paint onto a flexible support continuously running along distal end surfaces of the upper lip and the lower lip is disclosed. The distal end of the lower lip of the die is constituted continuously from the slit by a planar portion, a first curve portion and a second curved portion. An inclination angle of the planar portion, a radius of curvature of the first curved portion, and a radius of curvature and a center of curvature of the second curved portion are set within predetermined ranges, respectively. Thus, with this coating device, a coated film of satisfactory shape having no coating irregularity or stripe can be formed even when high-speed coating and reduction in coating thickness are carried out or when dusts and particles are attached on the support surface.

3 Claims, 3 Drawing Sheets

COATING DEVICE

BACKGROUND OF THE INVENTION

This invention relates to a so-called extrusion coating device.

In general, a so-called coated-type magnetic recording medium in which a magnetic layer is formed by coating a base film, such as a polyester film, with a magnetic paint composed of magnetic powders, binder, dispersant or lubricant dispersed and kneaded in an organic solvent, is used as an audio tape or a video tape.

As a method for coating the base film with the magnetic paint in such coated-type magnetic recording medium, a role coating method using a roll, exemplified by a gravure roll method or a reverse roll method, is mainly employed. However, these roll coating methods have some problems. For example, failure in paint transfer from the roll to the base film generates irregularities in coating thickness causing output fluctuations and splash of paint, which result in drop-out. Also, as excessively supplied paint is returned to the paint mixing process, the paint quality is deteriorated. These problems tend to be more conspicuous particularly in high-speed coating.

An extrusion (die) method has recently been noted and partly applied for practical use as a new coating method to solve the foregoing problems. The extrusion method employs a die 24 which has its distal end composed of an upper lip 21 and a lower lip 22 and has a wide slit 23 between the upper lip 21 and the lower lip 22 with the vicinity of the distal end of the slit 23 formed in a doctor-edged shape, as shown in FIG. 1. A paint 25 continuously extruded through the slit 23 is applied with a uniform coating thickness to the surface of a base film 26 running along distal end surfaces of the upper lip 21 and the lower lip 22.

Meanwhile, in the coating device for the extrusion method, shapes of distal end surfaces 27, 28 of the upper lip 21 and the lower lip 22 abutted against the base film 26 largely affect the product quality. Conventionally, the distal end surfaces 27 and 28 exhibit the following shapes. That is, the distal end surface 27 of the upper lip 21 is inclined in relation to the vertical plane orthogonal to the slit 23. The distal end surface 28 of the lower lip 22 is constituted by an inclined surface 28a formed by cutting out a portion of distal end surface in the vicinity of the slit in a wedge shape, and a curved portion 28b continuing from the inclined surface 28a and having a radius of curvature of 5–200 mm.

With such coating device, when the base film 26 is caused to run along the distal end surfaces of the upper lip 21 and the lower lip 22 with the paint being extruded through the slit 23 between the upper lip 21 and the lower lip 22, the paint extruded through the slit 23 is continuously applied on the base film surface with the inclined surface 28a of the lower lip 22. Therefore, this inclined surface 28a of the lower lip 22 greatly affects the coating characteristics. In consideration of the inclined surface 28a, particularly referred to as a chamfer, generating appropriate coating pressures, it is normal that the inclined surface 28a has an inclination angle of 5°–60° to the vertical plane orthogonal to the slit and a thickness of 0.5–2.0 mm. With respect to other portions, for example, the gap of the slit 23 is approximately 400 μm, and the thickness of the lower lip is 3–5 mm.

However, in the coating device in which the distal end surface 28 of the lower lip 22 is composed of the chamfer 28a and the curved portion 28b continuing therefrom and having the radius of curvature of 5–200 mm, an edge of the chamfer 28a located on the boundary between the chamfer 28a and the curved portion 28b has an acute angle. Thus, following problems arise.

That is, the acute-angled edge of the chamfer 28a increases the possibility that the balance between the pressure of the paint and the tension of the base film changes on this edge. Thus, a minute change in the pressure of the paint or the tension of the base film alters the coating characteristics. Therefore, the coating speed cannot be raised higher than 500 m/min., which is disadvantageous to improvement of productivity.

Also, the acute-angled edge causes the distance between the chamfer 28a and the surface of the base film 26 to be relatively short. Consequently, the balance between the pressure of the paint and the tension of the base film tends to change easily in the width direction, and the change in the balance results in irregularities in coating thickness. Thus, it is difficult to reduce the thickness of the coated film.

In addition, the acute-angled edge of the chamfer 28a narrows the area of a portion supporting the base film 26 on the distal end surface of the die under the pressure of the paint. Therefore, the distance between the edge of the chamfer 28a and the base film 26 is reduced. When fine particles and dusts are present on the base film 26 in this case, the particles and dusts are trapped on the edge of the chamfer 28a, thus disturbing flow of the paint and causing coating defects, such as stripes.

OBJECT AND SUMMARY OF THE INVENTION

In view of the foregoing, it is an object of the present invention to provide a coating device which is capable of forming a coated film of satisfactory shape having no coating irregularities and stripes even when high-speed coating and reduction in coating thickness are carried out or even when dusts and particles are attached on the base film surface.

According to the present invention, there is provided an extrusion coating device comprising a die having its distal end composed of an upper lip and a lower lip and having a slit provided between the upper lip and the lower lip, for extruding a paint through the slit to apply the paint onto a flexible support continuously running along distal end surfaces of the upper lip and the lower lip. The distal end of the lower lip of the die is constituted continuously from the slit by a planar portion, a first curve portion and a second curved portion. The planar portion has an inclination angle of 5°–60° to a vertical plane orthogonal to the slit, and has a thickness of 0.2–2.0 mm. The first curved portion has a radius of curvature of 0.1–2.0 mm. The second curved portion has a center of curvature in a range of 0–30 mm from a slit surface of the lower lip toward the upper lip, and has a radius of curvature of 5–200 mm.

In the die in which the distal end of the lower lip is constituted continuously from the slit by the planar portion, the first curved portion and the second curved portion, with the planar portion having the inclination angle of 5°–60° to the vertical plane orthogonal to the split and having the thickness of 0.2–2.0 mm, the first curved portion having the radius of curvature of 0.1–2.0 mm, and the second curved portion having the center of curvature in a range of 0–30 mm from the slit surface of the lower lip toward the, upper lip and having the radius of curvature of 5–200 mm, an edge of a chamfer is moderately curved by the first curved portion. In such die, a portion where the pressure of the paint reaches the highest level (pressure peak portion) on the distal end surface of the die is broadly diffused, and the peak pressure is stabilized. Consequently, effects of the change in the tension of the base film and the change in the pressure itself can be reduced, so that high-speed coating at 500 m/min. or faster can be stably carried out. Also, since the pressure peak portion is broadly diffused, a locally high pressure portion and a locally low pressure portion as causes of coating irregularities can be eliminated. Thus, it is possible to reduce the coating irregularities and realize thin film coating. In addition, as the first curved portion continues to the chamfer, dusts and particles attached on the base film, if any, are not trapped on the edge of the chamfer, so that the base film can smoothly pass. Accordingly, generation of the stripes on the coating film is restrained.

DESCRIPTION OF THE PREFERRED EMBODIMENT

A preferred embodiment of the present invention will now be described with reference to the attached drawings.

Figure 1:
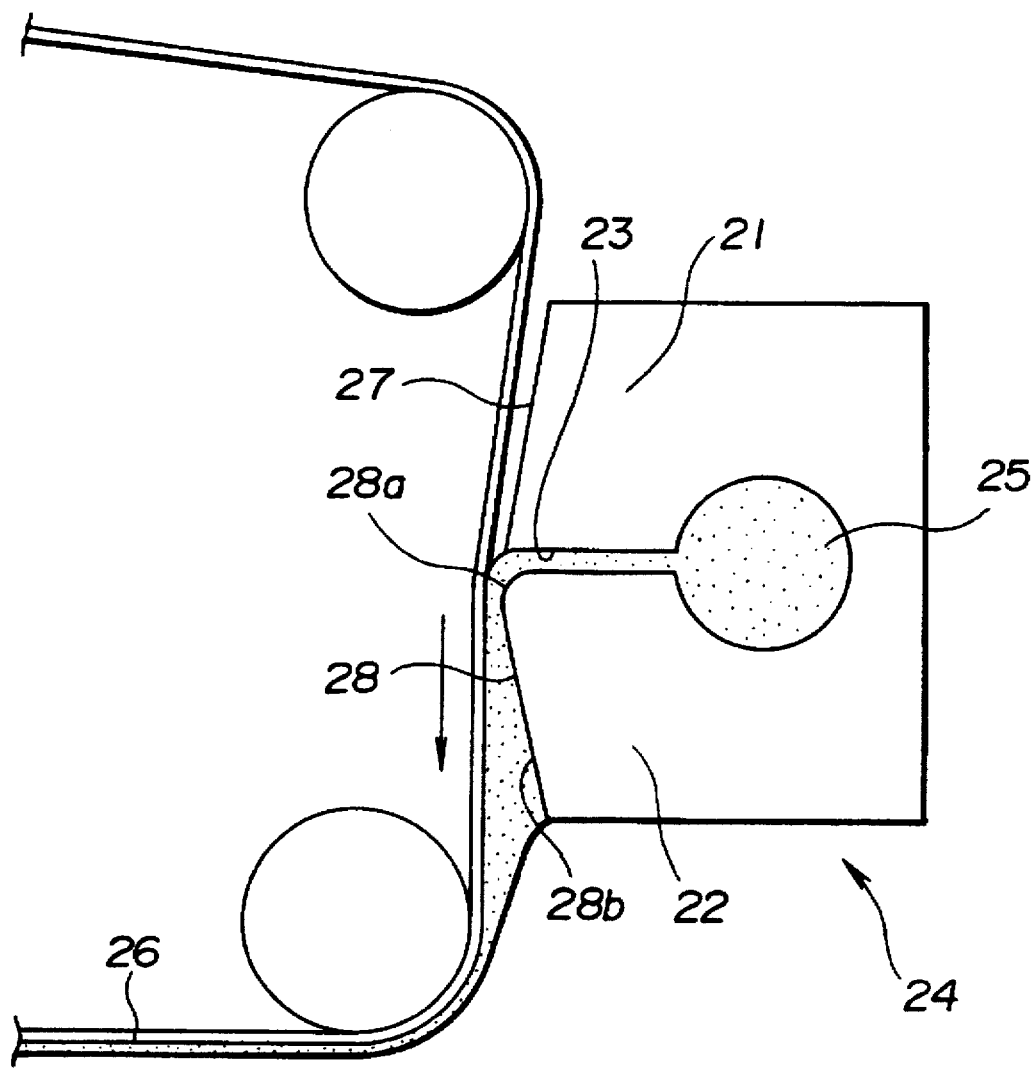
FIG. 1 is a cross-sectional view showing a conventional coating device.
Figure 2:
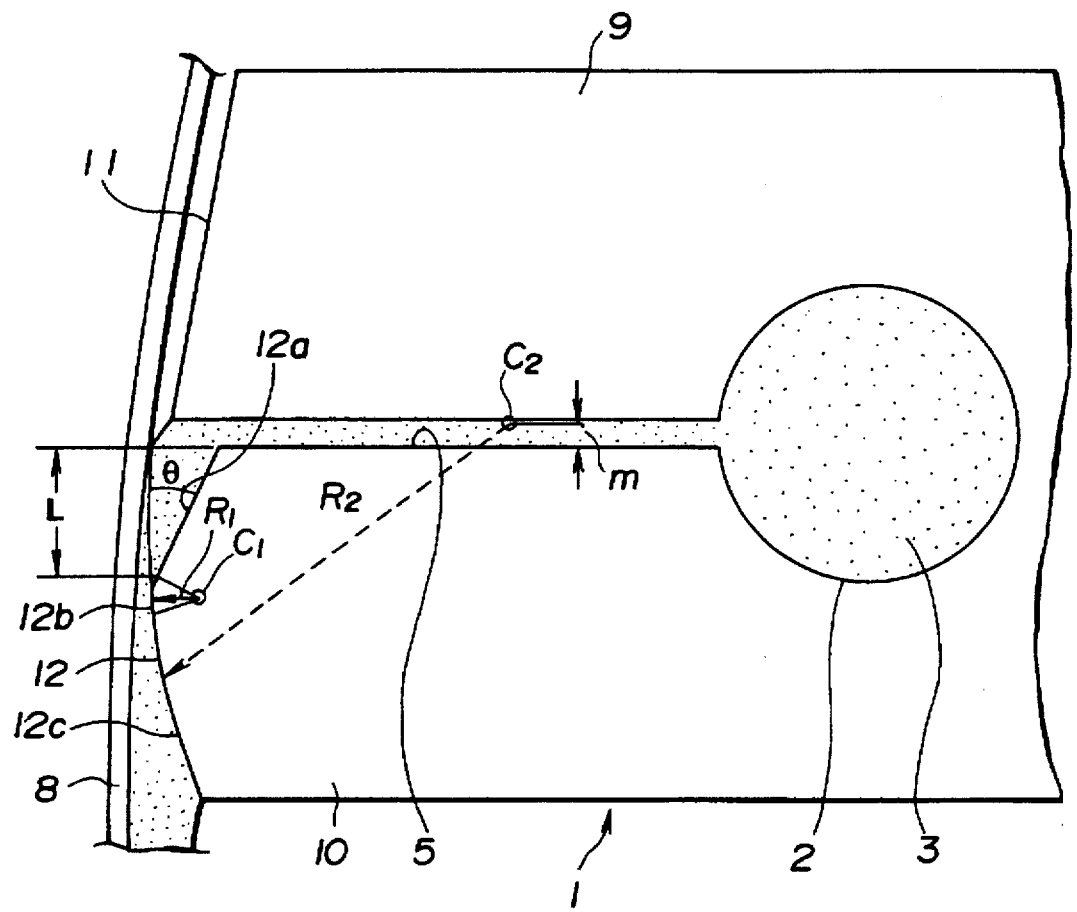
FIG. 2 is a cross-sectional view showing an exemplary structure of a coating device according to the present invention.

A coating device of the present embodiment is used for coating with a magnetic paint or a non-magnetic back-coating paint in a manufacturing process of a coated-type magnetic recording medium. With this coating device, a magnetic paint 3 is supplied into a pocket (paint pool) 2 of a die (extruder) 1, and is extruded through a slit 5 to be applied onto a base film 8 which is caused to run via a guide roll, as shown in FIG. 2.

The die is a substantially rectangular-parallelopiped metal block having a predetermined width, and has its distal end divided into an upper lip 9 and a lower lip 10. The slit 5 is formed between the upper lip 9 and the lower lip 10.

The slit 5 is defined as a gap through which the paint is extruded. The slit 5 is formed to be exposed to distal end surfaces 11, 12 of the die 1 with a width corresponding to a coating width. The slit 5 is normally an extremely narrow gap of approximately 100–400 μm.

On the back surface of the slit 5, the pocket 2 communicating with the slit 5 is formed as a cylindrical space having a length substantially equal to the width of the slit 5. On both ends of the pocket 2, paint supply ports smaller in inner diameter than the pocket 2 are provided to open to both lateral sides of the die. The paint 3 is supplied into the pocket 2 from these paint supply ports. Thus, the pocket 2 is a space to receive the paint fed under pressure from a paint supply unit, and has functions of an accumulator.

Since the base film 8 runs along the distal end surfaces of the upper lip 9 and the lower lip 10 on the distal end of the die 1 so as to be coated with the paint, the upper lip 9 and the lower lip 10 are formed in a suitable shape for this processing.

That is, the upper lip 9 has on its distal end an inclined surface 11 in relation to the vertical plane orthogonal to the slit 5.

On the other hand, the lower lip 10 has a chamfer 12a by having its distal end in the vicinity of the slit 5 cut out in a wedge shape. The chamfer 12a has an inclination angle θ of 5°–60° to the vertical plane and a thickness L of 0.2–2.0 mm. The lower lip 10 also has a first curved portion 12b continuing from the chamfer 12a and having a radius of curvature $R_1$ of 0.1–2.0 mm, and a second curved portion 12c having a center of curvature $C_2$ in a range m of 0–30 mm from a slit surface of the lower lip 10 toward the upper lip 9 and a radius of curvature $R_2$ of 5–200 mm. The distal end of the lower lip 10 is thus formed.

In the coating device of the above-described structure, the paint 3 supplied to the pocket 2 of the die 1 from the paint supply unit is made uniform in pressure by the accumulator effect, and is uniformly extruded to the slit 5. The base film 8 continuously runs along the distal end surfaces of the upper lip 9 and the lower lip 10 on the distal end of the die 1, so that the paint 3 extruded through the slit 5 is continuously applied to the base film 8 on the chamfer 12a of the lower lip 10.

With this coating device in which the distal end of the lower lip 10 is constituted continuously by the chamfer 12a, the first curved portion 12b and the second curved portion 12c, as described above, satisfactory coating characteristics can be obtained.

Figure 3:
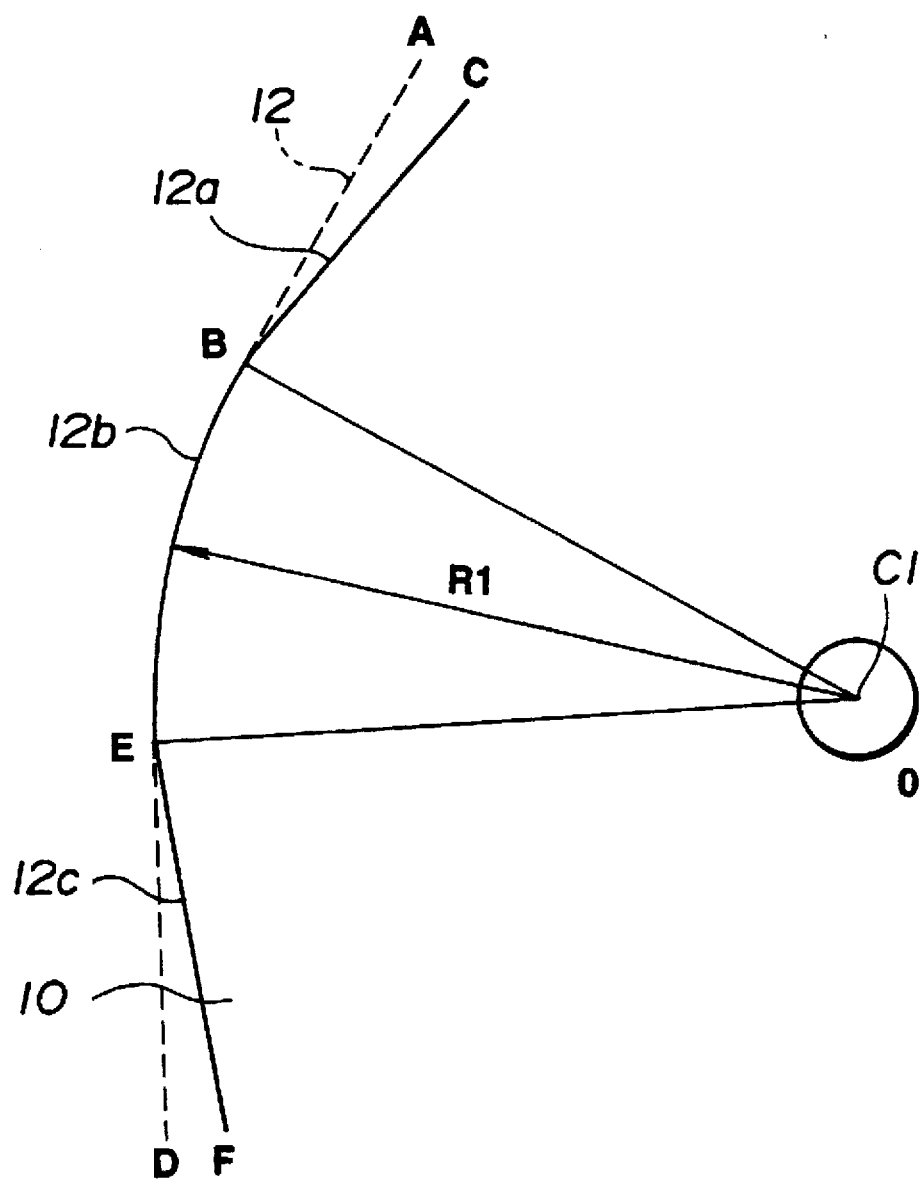
FIG. 3 is an enlarged view of a first curved portion of the coating device according to the present invention.

In this coating device, the distal end of the lower lip 10 has the first curved portion 12b having the relatively small radius of curvature $R_1$ of 0.1–2.0 mm between the chamfer 12a and the second curved portion 12c having the radius of curvature $R_2$ of 5–200 mm, that is, at the edge position of the chamfer 12a, as shown in an enlarged view of FIG. 3. Thus, the edge of the chamfer 12a is moderately curved. As the chamfer 12a continues to the first curved portion 12b with the edge of the chamfer 12a moderately curved, a portion where the pressure of the paint reaches the maximum level on the distal end of the die 1 (pressure peak portion) is broadly diffused, and the peak pressure is stabilized. Consequently, the effect of the change in the tension of the base film 8 and the change in the pressure of the paint itself are reduced, so that high-speed coating at 500 m/min. or faster can be stably carried out. Also, since the pressure peak portion is broadly diffused, the locally high pressure portion and the locally low pressure portion as causes of coating irregularities can be eliminated. Thus, it is possible to reduce coating irregularities and realize thin film coating. In addition, as the chamfer 12a continues to the first curved portion 12b, dusts and particles attached on the base film 8, if any, are not trapped on the edge of the chamfer 12a, and the base film can smoothly pass. Thus, generation of stripes on the coated film can be restrained.

A more preferred range of the radius of curvature of the first curved portion 12b is 0.4–1.6 mm. The position of the center of curvature of the first curved portion 12b is not particularly specified because the center of curvature is automatically determined by positioning the first curved portion 12b between the chamfer 12a and the second curved portion 12c in such a manner that the chamber 12a, the first curved portion 12b and the second curved portion 12c are continuously formed.

The first curved portion 12b is a curved plane with an extremely small radius of curvature, and a minute error in the shape of this curved plane is allowable. As shown in FIG. 3, an allowable range of an angle ∠ABC of a tangent AB on the boundary B between the chamfer 12a and the first curved portion 12b to the chamfer 12a is set to $0° \leq \angle ABC \leq 5°$. An allowable range of an angle ∠DEF of a tangent ED on the boundary E between the first curved portion 12b and the second curved portion 12c to the second curved portion 12c is set to $0° \leq \angle DEF \leq 5°$.

The inclination angle of the chamfer 12a is limited to 5°–60° for the purpose of forming a wedge-shaped space between the base film 8 and the chamfer 12a and raising the pressure of the paint at this point to float the base film 8 from the distal end surface of the lower lip 10 with the paint. The thickness L of the chamfer 12a is limited to 0.2–2.0 mm for the following reasons. That is, if the length of the chamfer 12a is small, the paint pressure in the space surrounded by the planar portion and the base film rapidly increases and the coating state becomes unstable. On the other hand, if the length of the chamfer 12a is excessively large, the planar portion becomes less effective. It is preferred that the paint pressure is raised slowly in the wedge-shaped space surrounded by the planar portion and the base film. In view of this, the foregoing range is determined.

The second curved portion 12c continuing from the first curved portion 12b is curved to facilitate smooth flow of the paint. For this purpose, the center of curvature $C_2$ and the radius of curvature $R_2$ are limited to the foregoing ranges.

In addition, the entire lower lip 10 having the chamfer 12a, the first curved portion 12b and the second curved portion 12c is preferably 3–5 mm in thickness.

Now, the following test was conducted to confirm the effects of limiting the distal end of the lower lip 10 to the above-described shape in the coating device.

A variety of dies were prepared having the thickness L of the chamfer, the radius of curvature $R_1$ of the first curved portion, the radius of curvature $R_2$ of the second curved portion, the thickness t of the lower lip and the slit gap width G, set as follows.

Thickness L of chamfer: 0.5–1.0 mm
Radius of curvature $R_1$ of the first curved portion:
>0.1 mm, 0.1 mm, 0.2 mm, 0.4 mm, 0.8 mm, 1.2 mm, 1.6 mm, 2.0 mm
Radius of curvature $R_2$ of the second curved portion: 30–100 mm
Thickness t of the lower lip: 3.0 mm
Slit gap width G: 300 μm Using these dies, an oxide-type paint for video with a viscosity of 2000–6000 cps and a carbon paint for back coating with a viscosity of 20–100 cps were applied to front and back surfaces, respectively, of a base film made of polyethylene terephthalate. The oxide-type paint for video and the carbon paint for back coating are of the following composition. Composition of oxide-type paint for video iron oxide magnetic powder (specific surface area 35 m²/g) 100 parts by weight
nitrocellulose resin 4 parts by weight
polyvinyl chloride resin (—OSO₃K contained) 8 parts by weight
polyester polyurethane resin (—OSO₃Na contained) 8 parts by weight
carbon (average grain size 20 nm) 4 parts by weight
alumina (average grain size 500 nm) 6 parts by weight
myristic acid 1 part by weight
butyl stearate 1 part by weight
methylethyl ketone 80 parts by weight
toluene 80 parts by weight
cyclohexanone 40 parts by weight
Composition of carbon paint for back coating
carbon (average grain size 30 nm) 100 parts by weight
polyester polyurethane resin 40 parts by weight
methylethyl ketone 280 parts by weight
toluene 140 parts by weight
cyclohexanone 140 parts by weight The coating thicknesses of the oxide-type paint for video and the carbon paint for back coating are 1.0–6.0 μm and 0.2–2.0 μm, respectively. The coating speed is 250 m/min. or 500 m/min. Coating states under these conditions are shown in Tables 1 to 3.

TABLE 1

Paint: oxide-type magnetic paint for video

| Radius of Curvature $R_1$ of First Curved Portion [mm] | Coating Thickness [μm] | Coating Speed [m/min] | Coating State | Evaluation |
|---|---|---|---|---|
| <0.1 ($R_1$-0) | 3.0 | 500 | Overflow | x |
| 0.1 | 3.0 | 500 | Overflow | x |
| 0.2 | 3.0 | 500 | Overflow | x |
| 0.4 | 3.0 | 500 | Unstable Liquid Surface Between Upper Lip and Film | ∆–○ |
| 0.8 | 3.0 | 500 | Satisfactory Coating | ○ |
| 1.2 | 3.0 | 500 | Satisfactory Coating | ○ |
| 1.6 | 3.0 | 500 | Unstable Liquid Surface Between Upper Lip and Film | ○–∆ |
| 2.0 | 3.0 | 500 | Chip and Stripe | ∆ |

TABLE 2

Paint: carbon paint for back coating

| Radius of Curvature $R_1$ of First Curved Portion [mm] | Coating Thickness [μm] | Coating Speed [m/min] | Coating State | Evaluation |
|---|---|---|---|---|
| <0.1 ($R_1$-0) | 0.7 | 500 | Coating Irregularity | x |
| 0.1 | 0.7 | 500 | Coating Irregularity | ∆ |
| 0.2 | 0.7 | 500 | Slight Coating Irregularity | ∆–○ |
| 0.4 | 0.7 | 500 | Satisfactory Coating | ○ |
| 0.8 | 0.7 | 500 | Satisfactory Coating | ○ |
| 1.2 | 0.7 | 500 | Satisfactory Coating | ○ |
| 1.6 | 0.7 | 500 | Satisfactory Coating | ○ |
| 2.0 | 0.7 | 500 | Unstable Liquid Surface Between Upper Lip and Film | ○–∆ |

TABLE 3

Paint: carbon paint for back coating

| Radius of Curvature $R_1$ of First Curved Portion [mm] | Coating Thickness [μm] | Coating Speed [m/min] | Coating State | Evaluation |
|---|---|---|---|---|
| <0.1 ($R_1$-0) | 0.3 | 250 | Coating Irregularity | x |
| 0.1 | 0.3 | 250 | Coating Irregularity | x |
| 0.2 | 0.3 | 250 | Coating Irregularity | ∆ |

TABLE 3-continued

Paint: carbon paint for back coating

| Radius of Curvature $R_1$ of First Curved Portion [mm] | Coating Thickness [μm] | Coating Speed [m/min] | Coating State | Evaluation |
|---|---|---|---|---|
| 0.4 | 0.3 | 250 | Slight Coating Irregularity | Δ–o |
| 0.8 | 0.3 | 250 | Satisfactory Coating | o |
| 1.2 | 0.3 | 250 | Satisfactory Coating | o |
| 1.6 | 0.3 | 250 | Unstable Liquid Surface Between Upper Lip and Film | o–Δ |
| 2.0 | 0.3 | 250 | Chip and Stripe | x |

The radius of curvature $R_1<0.1$ is eventually means that the first curved portion 12b is not formed.

As seen from Tables 1 to 3, the coating state of the paint changes in accordance with the radius of curvature $R_1$ of the first curved portion 12b of the lower lip 10 of the die. When the first curved portion 12b is absent ($R_1<0.1$), overflow or coating irregularities are generated, disturbing satisfactory coating. By providing the first curved portion 12b having an appropriate radius of curvature $R_1$, satisfactory coating performance can be obtained even when a paint of relatively high viscosity is applied at a high speed.

Thus, it is found effective to constitute the distal end of the lower lip of the die by the chamfer, the first curved portion and the second curved portion for improving the coating performance.

What is claimed is:

1. An extrusion coating device comprising a die having its distal end composed of an upper lip and a lower lip and having a slit provided between the upper lip and the lower lip, for extruding a paint through the slit to apply the paint onto a flexible support continuously running along distal end surfaces of the upper lip and the lower lip, the distal end of the lower lip of the die having a surface comprising a planar surface portion, a first curved surface portion and a second curved surface portion arranged contiguously in order from upstream to downstream in a flow direction of the paint extruded through the slit, the planar surface portion having an inclination angle of 5°–60° to a vertical plane orthogonal to the slit and a thickness of 0.2–2.0 mm, the first curved surface portion having a radius of curvature of 0.1–2.0 mm, the second curved surface portion having a center of curvature located at a point 0–30 mm distance from a slit surface of the lower lip toward the upper lip and having a radius of curvature of 5–200 mm.

2. The device according to claim 1, wherein said first curved surface path has a radius of curvature of 0.4–1.6 mm.

3. The device according to claim 2, wherein said planar surface portion, said first curved surface portion and said second curved surface portion together have a thickness dimension of 3–5 mm.

* * * * *